(12) United States Patent
Lang et al.

(10) Patent No.: US 7,312,286 B2
(45) Date of Patent: Dec. 25, 2007

(54) FLEXIBLE SUPERABSORBENT BINDER POLYMER COMPOSITION

(75) Inventors: Angela Jones Lang, High Point, NC (US); Dave Allen Soerens, Neenah, WI (US); Iqbal Ahmed, Greensboro, NC (US); Scott J. Smith, Greensboro, NC (US)

(73) Assignee: Stockhausen, Inc., Greensboro, NC (US)

( * ) Notice: Subject to any disclaimer, the term of this patent is extended or adjusted under 35 U.S.C. 154(b) by 25 days.

(21) Appl. No.: 11/293,043

(22) Filed: Dec. 2, 2005

(65) Prior Publication Data

US 2007/0129515 A1 Jun. 7, 2007

(51) Int. Cl.
*C08F 4/04* (2006.01)
*C08F 20/06* (2006.01)

(52) U.S. Cl. .............. 526/218.1; 526/319; 526/279; 526/317.1

(58) Field of Classification Search ............ 526/218.1, 526/319, 279, 317.1
See application file for complete search history.

(56) References Cited

U.S. PATENT DOCUMENTS

| | | | |
|---|---|---|---|
| 3,617,362 A | 11/1971 | Bemmels | |
| 3,959,242 A | 5/1976 | Watts et al. | |
| 3,963,605 A | 6/1976 | Seabourn | |
| 3,963,805 A | 6/1976 | Chu | |
| 4,251,643 A | 2/1981 | Harada et al. | |
| 4,291,136 A | 9/1981 | Keogh | |
| 4,328,323 A | 5/1982 | Keogh | |
| 4,343,917 A | 8/1982 | Keogh | |
| 4,353,997 A | 10/1982 | Keogh | |
| 4,369,289 A | 1/1983 | Keogh | |
| 4,408,011 A | 10/1983 | Barnabeo | |
| 4,434,272 A | 2/1984 | Keogh | |
| 4,440,907 A | 4/1984 | Keogh | |
| 4,446,279 A | 5/1984 | Keogh | |
| 4,459,396 A | 7/1984 | Yamasaki et al. | |
| 4,489,029 A | 12/1984 | Keogh et al. | |
| 4,493,924 A | 1/1985 | Rifi | |
| 4,502,968 A | 3/1985 | Noda et al. | |
| 4,526,930 A | 7/1985 | Keogh | |
| 4,551,504 A | 11/1985 | Barnabeo | |
| 4,575,535 A | 3/1986 | Keogh | |
| 4,579,913 A | 4/1986 | Keogh | |
| 4,593,071 A | 6/1986 | Keogh | |
| 4,676,820 A | 6/1987 | Le Sergent et al. | |
| 4,753,993 A | 6/1988 | Keogh | |
| 4,767,820 A | 8/1988 | Keogh | |
| 4,806,594 A | 2/1989 | Gross et al. | |
| 4,921,136 A | 5/1990 | Roggenburg, Jr. | |
| 4,940,646 A | 7/1990 | Pawlowski | |
| 5,047,476 A | 9/1991 | Keogh | |
| 5,089,564 A | 2/1992 | Bullen | |
| 5,112,919 A | 5/1992 | Furrer et al. | |
| 5,145,906 A | 9/1992 | Chambers et al. | |
| 5,196,470 A | 3/1993 | Anderson et al. | |
| 5,204,404 A | 4/1993 | Werner, Jr. et al. | |
| 5,354,829 A | 10/1994 | Swisher et al. | |
| 5,364,382 A | 11/1994 | Latimer et al. | |
| 5,389,728 A | 2/1995 | Prejean | |
| 5,532,350 A | 7/1996 | Cottrell et al. | |
| 5,656,132 A | 8/1997 | Farrington, Jr. et al. | |
| 5,853,867 A | 12/1998 | Harada et al. | |
| 5,911,937 A | 6/1999 | Hekal | |
| 5,932,668 A | 8/1999 | Friebe et al. | |
| 5,945,476 A | 8/1999 | Roesler et al. | |
| 6,013,855 A | 1/2000 | McPherson et al. | |
| 6,020,071 A | 2/2000 | Watson | |
| 6,020,171 A | 2/2000 | Saito et al. | |
| 6,054,523 A | 4/2000 | Braun et al. | |
| 6,110,533 A | 8/2000 | Cote et al. | |
| 6,183,872 B1 | 2/2001 | Tanaka et al. | |
| 6,200,684 B1 | 3/2001 | Yamaguchi et al. | |
| 6,403,857 B1 | 6/2002 | Gross et al. | |
| 6,417,425 B1 | 7/2002 | Whitmore et al. | |
| 6,458,877 B1 | 10/2002 | Ahmed et al. | |
| 6,534,572 B1 | 3/2003 | Ahmed et al. | |
| 6,596,402 B2 | 7/2003 | Soerens et al. | |
| 6,737,491 B2 | 5/2004 | Soerens et al. | |
| 2002/0049417 A1 | 4/2002 | Onishi et al. | |
| 2002/0090453 A1 | 7/2002 | Muthiah et al. | |
| 2002/0132540 A1 | 9/2002 | Soerens et al. | |
| 2004/0018365 A1 | 1/2004 | Krautkramer et al. | |

(Continued)

FOREIGN PATENT DOCUMENTS

CA 756190 4/1967

(Continued)

*Primary Examiner*—Robert D. Harlan
(74) *Attorney, Agent, or Firm*—Smith Moore LLP

(57) ABSTRACT

A flexible superabsorbent binder polymer composition including a monoethylenically unsaturated polymer, such as carboxylic acid, sulphonic acid, or phosphoric acid, or salts thereof, and an acrylate or methacrylate ester that contains an alkoxysilane functionality, or a monomer capable of co-polymerization with a compound containing a trialkoxysilane functional group and subsequent reaction with water to form a silanol group wherein the flexible superabsorbent binder polymer composition has a residual monoethylenically unsaturated monomer of less than about 1000 ppm. The flexible superabsorbent binder polymer composition is particularly suitable for use in manufacturing absorbent articles. A method of making the flexible superabsorbent binder polymer composition includes preparing a monomer solution, adding the monomer solution to an initiator system, and activating a polymerization initiator within the initiator system.

28 Claims, No Drawings

| U.S. PATENT DOCUMENTS | | | FOREIGN PATENT DOCUMENTS | | |
|---|---|---|---|---|---|
| 2004/0018366 A1 | 1/2004 | George et al. | EP | 0132910 | 2/1985 |
| 2004/0019166 A1 | 1/2004 | Soerens et al. | EP | 0475664 | 3/1992 |
| 2004/0019168 A1 | 1/2004 | Soerens et al. | EP | 0705861 | 4/1996 |
| 2004/0019339 A1 | 1/2004 | Ranganathan et al. | EP | 0844265 | 5/1998 |
| 2004/0024092 A1 | 2/2004 | Soerens et al. | EP | 0992252 | 4/2000 |
| 2004/0043688 A1 | 3/2004 | Soerens et al. | EP | 1013291 | 6/2000 |
| 2004/0106721 A1 | 6/2004 | Soerens | EP | 1059320 | 12/2000 |
| 2004/0116014 A1 | 6/2004 | Soerens et al. | EP | 1199059 | 4/2002 |
| 2004/0116885 A1 | 6/2004 | Soerens et al. | WO | WO 99/57201 | 11/1999 |
| 2004/0122390 A1 | 6/2004 | Soerens et al. | WO | WO 02/053664 | 7/2002 |

FLEXIBLE SUPERABSORBENT BINDER POLYMER COMPOSITION

BACKGROUND

This invention is directed to a flexible superabsorbent binder polymer composition, and a method of making the flexible superabsorbent binder polymer composition and absorbent binder or coating composition including the superabsorbent polymer composition.

Adhesives, or binders, are a necessary element of many absorbent products. While adhesives beneficially hold products together, adhesives may also have a tendency to interfere with the absorbency of fluids in absorbent products. Adhesives are typically hydrophobic and therefore are not conducive to absorbency or liquid transfer functions. Furthermore, most adhesives are non-absorbent and thus serve no liquid retention function.

Hydrophilic adhesives are known, such as adhesives formulated from water-soluble polymers such as poly(vinyl alcohol), poly(vinyl methyl ether), poly(vinyl pyrrolidone), poly(ethylene oxide), or cellulose derivatives such as hydroxypropyl cellulose. Dextrans, starches and vegetable gums have been used to provide hydrophilic adhesives. These materials provide adhesion under dry conditions. However, upon exposure to aqueous fluids, these materials lose bonding capability because they are substantially soluble in aqueous fluids.

A known approach for making hydrophilic adhesives more functional upon exposure to aqueous fluid is to crosslink the water-soluble polymers. As a result of crosslinking, the material becomes swellable, and no longer soluble, in aqueous fluid. However, since crosslinked polymers are thermosets, they are difficult to apply to substrates or to establish intimate contact with surfaces because the crosslinked polymers are solid materials and have little or no ability to flow. Usually crosslinked polymers are hard, rigid and brittle. These polymers do not have flexibility that many absorbent products need for end uses of the polymers.

What is therefore needed is a flexible superabsorbent binder polymer composition, which may be referred to as flexible absorbent binder or FAB herein, for use in a hydrophilic flexible binder or coating that has latent crosslinking capability. Such a superabsorbent polymer composition could be easily applied, like a water-soluble polymer, since the hydrophilic polymer solution would be capable of flow prior to crosslinking. Latent crosslinking capability would also provide a simple means of crosslinking the polymer after the polymer has established intimate contact with substrates or has formed a desired final shape or form.

Recent development efforts have provided coating materials for a variety of uses. For example, U.S. Pat. No. 6,054,523, to Braun et al., describes materials that are formed from organopolysiloxanes containing groups that are capable of condensation, a condensation catalyst, an organopolysiloxane resin, a compound containing a basic nitrogen, and polyvinyl alcohol. The materials are reported to be suitable for use as hydrophobic coatings and for paints and sealing compositions.

Soerens et al., in U.S. Pat. No. 6,737,491, describes an absorbent binder composition including a monoethylenically unsaturated polymer and an acrylate or methacrylate ester that contains an alkoxysilane functionality that is particularly suitable for use in manufacturing absorbent articles. Also described in Soerens et al. is a method of making the absorbent binder composition that includes the steps of preparing a monomer solution, adding the monomer solution to an initiator system, and activating a polymerization initiator within the initiator system reported an alcohol-based, water-soluble binder composition. One of the issues in preparing water-soluble polymers is the amount of the residual monoethylenically unsaturated monomer content remaining in the polymer. For applications in personal hygiene it is required the amount of residual monoethylenically unsaturated monomer content of the superabsorbent polymer composition be less than about 1000 ppm. In addition, it is desirous for the flexible superabsorbent binder composition to have a solids content of at least 24%. Also it is desirous to have a uniform and reproducible viscosity at the solids level of greater than 24%.

In addition to the foregoing, another aspect of the existing flexible absorbent binder composition is that a relatively dilute polymer solution must be used so that the solution does not begin to crosslink, wherein crosslinking is known a gelling. Since the solution is generally used by applying the solution to a substrate and then drying the solution to form the crosslinked, absorbent coating, the cost of drying a dilute solution may be more costly then desirous.

In the case of using alkoxysilane as a crosslinking agent, gelling can be explained, without this invention being limited by the following theory, as a function of the statistical probability that the alkoxysilane functional units on two polymer chains "find" each other in solution to allow condensation and formation of a crosslink. One approach is to keep this probability low by using a polymer concentration of about 20% by weight. Another approach is to reduce the probability of gellation by reducing the amount of alkoxysilane functionality incorporated into the polymer. For example, a simple approximation suggests that incorporating half as much alkoxysilane into the polymer should allow the polymer concentration to be doubled. Thus a 40% polymer solution with half the alkoxysilane incorporation should have the same stability as the current 20% solution of flexible superabsorbent binder polymer composition. However, the 40% solution requires much less energy and cost to dry the solution into an absorbent coating. Reducing the alkoxysilane incorporation, however, reduces the overall crosslink density of the absorbent coating. A "sloppy" absorbent that is too low in gel strength for functional absorbency is likely to result. As set forth in the present invention, this sloppiness can be overcome by adding a new source of crosslinking functionality just before the concentrated binding/coating solution is applied to a substrate.

What is therefore needed is a hydrophilic polymer that has latent crosslinking capability and which can be produced at an attractive cost. Such polymers could be easily applied, like a water-soluble polymer, since the hydrophilic polymer would be capable of flow prior to crosslinking. Latent crosslinking capability would also provide a simple means of crosslinking the polymer after the polymer has established intimate contact with substrates or has formed a desired final shape or form. There is also a need or desire for such a polymer which has a suitable level of flexibility.

In addition, there is thus a need within the field of absorbent products for flexible absorbent binders, adhesives, or coatings from a polymer solution wherein the superabsorbent polymer composition has a residual monoethylenically unsaturated monomer of less than about 1000 ppm, and less than about 500 ppm. In addition, it is an objective of the present invention to increase the solids content of the polymer solution to at least about 24%, and at least about 30%. Another objective of the present invention is to have a viscosity after 16 hours of the superabsorbent polymer composition of less than about 10,000 cps, and in the range of from about 1,000 to about 5000 cps.

Furthermore, there is a need within the field of absorbent products for such flexible absorbent binders, adhesives, or coatings that can be prepared by post-application, moisture-induced crosslinking of superabsorbent polymers.

SUMMARY

In response to the needs in the field of superabsorbent polymers, a new flexible superabsorbent binder polymer composition, useful as a flexible binder, adhesive, or coating material, is the subject matter of this application. The superabsorbent polymer composition includes a binder polymer that has the capability of post-application, moisture-induced crosslinking and a residual monoethylenically unsaturated monomer content of less than about 1000 ppm. This capability provides for absorbent products having greater use in hygiene products.

The flexible superabsorbent binder polymer composition is formed by the reaction of a monomer solution including at least 15% by mass monoethylenically unsaturated monomer, an acrylate or methacrylate ester that contains an alkoxysilane functionality; a copolymerizable hydrophilic glycol containing an ester monomer; and an initiator system, wherein the flexible superabsorbent binder polymer composition has a residual monoethylenically unsaturated monomer content of less than about 1000 ppm.

In another aspect, the flexible superabsorbent binder polymer composition may be made from monomers that are at least 15% by mass monoethylenically unsaturated monomer, an initiator system; an acrylate or methacrylate ester that contains an alkoxysilane functionality; and a plasticizer, wherein said superabsorbent polymer has a weight average molecular weight of from about 100,000 to about 650,000 g/mol, and the superabsorbent polymer composition has a viscosity after 16 hours of less than about 10,000 cps and a residual monoethylenically unsaturated monomer content of less than about 1000 ppm. Furthermore, in another aspect, the flexible superabsorbent binder polymer composition has a solids content of at least 24%.

In still another aspect, the flexible superabsorbent binder polymer composition is made by a process including the steps of a) preparing an initiator system; b) preparing a monomer solution including monoethylenically unsaturated monomers, one of which includes an alkyloxysilane functionality; c) mixing the initiator system and the monomer solution to form a polymerization solution; d) polymerizing the solution; (e) optionally neutralizing the polymer of step d); the dry polymer of which has a residual monoethylenically unsaturated monomer content of less than about 1000 ppm.

In still another aspect, the flexible superabsorbent binder polymer composition is made in water by a process including the steps of a) preparing a aqueous monomer solution including a plasticizer, a component of a redox initiator system, thermal initiator, a crosslinking monomer that contains an alkoxysilane functionality, a chain transfer agent; monoethylenically unsaturated monomer, including acid groups that are neutralized to at least 25 mol %; b) initiating the monomer solution mixture of step a) to polymerize said monomer solution mixture of a) to at least 50% degree of neutralization; c) adding a second monomer solution comprising; monoethylenically unsaturated monomer, including acid groups that are neutralized to at least 25 mol % and optionally the remaining elements of step a) to the polymerization solution of step b); d) polymerizing the solution of step c); and e) optionally neutralizing the polymer of step d) to form a flexible superabsorbent binder polymer composition having a average molecular weight of from about 100,000 to about 650,000 g/moles, a viscosity after 16 hours of less than about 10,000 cps, and a residual monoethylenically unsaturated monomer content of less than about 1000 ppm.

With the foregoing in mind, it is a feature and advantage of the invention to provide a flexible binder polymer solution, and a method of making the flexible binder polymer solution and coating composition.

DEFINITIONS

It should be noted that, when employed in the present disclosure, the terms "comprises," "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

The term "absorbent article" generally refers to a device, which can absorb and contain fluids. For example, personal care absorbent articles refer to devices, which are placed against or near the skin to absorb and contain the various fluids discharged from the body. The term "disposable" is used herein to describe absorbent articles that are not intended to be laundered or otherwise restored or reused as an absorbent article after a single use. Examples of such disposable absorbent articles include, but are not limited to, personal care absorbent articles, health/medical absorbent articles, and household/industrial absorbent articles.

The term "binder" includes materials that are capable of attaching themselves to a substrate or are capable of attaching other substances to a substrate.

The term "knife over roll coating" refers to a process in which a knife is positioned, with a specified gap, above a substrate that is moving beneath the knife on a moving roll. In this manner, the knife spreads a specified thickness of coating material onto the substrate.

The terms "nonwoven" and "nonwoven web" refer to materials and webs of material having a structure of individual fibers or filaments that are interlaid, but not in an identifiable manner as in a knitted fabric. The terms "fiber" and "filament" are used interchangeably. Nonwoven fabrics or webs have been formed from many processes such as, for example, melt blowing processes, spun bonding processes, air laying processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.) The term "polymers" includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible configurational isomers of the material. These configurations include, but are not limited to isotactic, syndiotactic and atactic symmetries.

The term "roll printing" or "roll coating" refers to a process in which the application of a deposited material, generally as a paste, onto a substrate is carried out by transferring the deposited material from a roll onto the substrate in a more or less uniform layer using one or more rolls, which may be engraved, and a pool cylinder. A doctor blade is used to scrape any excess deposited material from the rolls or substrate. The doctor blade may be flat or have a patterned edge such as slots or ridges.

The term "solution" when used in the phrase "flexible superabsorbent binder polymer solution," and derivatives thereof, refers to a polymer solution that has not yet been substantially crosslinked (i.e., a precursor), but will result in the flexible superabsorbent binder polymer composition once crosslinking occurs.

The term "spontaneous crosslinking" refers to crosslinking, which occurs without radiation, catalysis, or any other inducement other than the specified temperature of not more than about 150° C., such as not more than about 120° C., or not more than about 100° C.

The term "superabsorbent" refers to a water-swellable, water-insoluble organic or inorganic material capable, under the most favorable conditions, of absorbing at least about 10 times its weight or at least about 15 times its weight in an aqueous solution containing 0.9 weight percent sodium chloride. The superabsorbent materials can be natural, synthetic, and modified natural polymers and materials. In addition, the superabsorbent materials can be inorganic materials, such as silica gels, or organic compounds such as cross-linked polymers.

DETAILED DESCRIPTION

The present invention is directed to a flexible superabsorbent binder polymer composition having the capability of post-application, moisture-induced crosslinking. The present invention also includes a method of making and applying such a flexible superabsorbent binder polymer composition. The flexible superabsorbent binder polymer composition may be used in absorbent binder composition that can provide fluid retention properties in addition to adhesive properties. Thus, the flexible superabsorbent binder polymer composition is particularly suitable for use in forming absorbent products. Flexible superabsorbent binder polymer composition may be referred herein as composition or as superabsorbent polymer composition.

More specifically, the flexible superabsorbent binder polymer composition is the reaction product of at least 15% by mass monoethylenically unsaturated carboxylic, sulphonic or phosphoric acid or salts thereof, an acrylate or methacrylate ester that contains an alkoxysilane functionality which, upon exposure to water, forms a silanol functional group which condenses to form a crosslinked polymer, a copolymerizable hydrophilic glycol containing ester monomer; and/or, a plasticizer. Suitable monomers that may be included to make a suitable superabsorbent polymer solution include carboxyl group-containing monomers: for example monoethylenically unsaturated mono or poly-carboxylic acids, such as (meth)acrylic acid (meaning acrylic acid or methacrylic acid; similar notations are used hereinafter), maleic acid, fumaric acid, crotonic acid, sorbic acid, itaconic acid, and cinnamic acid; carboxylic acid anhydride group-containing monomers: for example monoethylenically unsaturated polycarboxylic acid anhydrides (such as maleic anhydride); carboxylic acid salt-containing monomers: for example water-soluble salts (alkali metal salts, ammonium salts, amine salts, and the like) of monoethylenically unsaturated mono- or poly-carboxylic acids (such as sodium (meth)acrylate, trimethylamine (meth)acrylate, triethanolamine (meth)acrylate), sodium maleate, methylamine maleate; sulfonic acid group-containing monomers: for example aliphatic or aromatic vinyl sulfonic acids (such as vinylsulfonic acid, allyl sulfonic acid, vinyltoluenesulfonic acid, styrene sulfonic acid), (meth)acrylic sulfonic acids [such as sulfopropyl (meth)acrylate, 2-hydroxy-3-(meth)acryloxy propyl sulfonic acid]; sulfonic acid salt group-containing monomers: for example alkali metal salts, ammonium salts, amine salts of sulfonic acid group containing monomers as mentioned above; and/or amide group-containing monomers: vinylformamide, (meth)acrylamide, N-alkyl (meth) acrylamides (such as N-methylacrylamide, N-hexylacrylamide), N,N-dialkyl (meth)acryl amides (such as N,N-dimethylacrylamide, N,N-di-n-propylacrylamide), N-hydroxyalkyl (meth)acrylamides [such as N-methylol (meth)acrylamide, N-hydroxyethyl (meth)acrylamide], N,N-dihydroxyalkyl (meth)acrylamides [such as N,N-dihydroxyethyl (meth)acrylamide], vinyl lactams (such as N-vinylpyrrolidone).

Suitably, the amount of monoethylenically unsaturated carboxylic, sulphonic or phosphoric acid or salts thereof relative to the weight of the flexible superabsorbent binder polymer composition may range from about 15% to about 99.9% by weight. In some aspects, the levels of monoethylenically unsaturated carboxylic, sulphonic or phosphoric acid or salts thereof may be between about 25% and about 99.9% by weight of the flexible superabsorbent binder polymer composition, such as between about 25% and about 90% by weight of the flexible superabsorbent binder polymer composition, or between about 30% and about 80% by weight of the flexible superabsorbent binder polymer composition; or between about 50% and about 70% by weight of the flexible superabsorbent binder polymer composition for some intended uses.

The acid groups are desirably neutralized to the extent of at least about 25 mol %, that is, the acid groups are preferably present as sodium, potassium or ammonium salts. The degree of neutralization is preferably at least about 50 mol %. It is preferred to obtain polymers obtained by polymerization of acrylic acid or methacrylic acid, the carboxyl groups of which are neutralized to the extent of from about 50 to about 80 mol %, in the presence of internal crosslinking agents. The neutralization can be accomplished prior to or post polymerization or a combination thereof.

Organic monomers capable of co-polymerization with monoethylenically unsaturated carboxylic, sulphonic or phosphoric acid or salts thereof, which monomers contain a trialkoxysilane functional group or a moiety that reacts with water to form a silanol group, are useful in the practice of this invention. The trialkoxysilane functional group has the following structure:

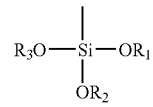

wherein $R_1$, $R_2$ and $R_3$ are alkyl groups independently having from 1 to 6 carbon atoms.

The term "monomer(s)" as used herein includes monomers, oligomers, polymers, mixtures of monomers, and any other reactive chemical species which is capable of co-polymerization with monoethylenically unsaturated carboxylic, sulphonic or phosphoric acid or salts thereof. Ethylenically unsaturated monomers containing a trialkoxysilane functional group are appropriate for this invention and are desired. Desired ethylenically unsaturated monomers include acrylates and methacrylates, such as acrylate or methacrylate esters that contain an alkoxysilane functionality. A particularly desirable ethylenically unsaturated monomer containing a trialkoxysilane functional group is methacryloxypropyl trimethoxy silane, commercially available from Dow Corning®, (having a place of business in Midland, Mich., U.S.A) under the trade designation Z-6030 Silane and from Degussa, (a business having offices in Parsippany, N.J., U.S.A) under the trade name DYNA-SYLAN® MEMO. Other suitable ethylenically unsaturated monomers containing a trialkoxysilane functional group include, but are not limited to, methacryloxyethyl trimethoxy silane, methacryloxypropyl triethoxy silane, methacryloxypropyl tripropoxy silane, acryloxypropylmethyl dimethoxy silane, 3-acryloxypropyl trimethoxy silane, 3-methacryloxypropylmethyl diethoxy silane, 3-methacryloxypropylmethyl dimethoxy silane, and 3-methacryloxypropyl tris(methoxyethoxy)silane. However, it is contemplated that a wide range of vinyl and acrylic monomers having trialkoxysilane functional groups or a moiety that reacts easily with water to form a silanol group, such as a chlorosilane or an acetoxysilane, provide the desired effects and are effective monomers for copolymerization in accordance with the present invention.

Whereas most superabsorbent polymers require addition of an internal crosslinker to reinforce the polymer, the flexible superabsorbent binder polymer composition of the present invention does not require the addition of a crosslinking agent because the organic monomers including the trialkoxysilane functional act as an internal crosslinker. The internal crosslinker allows the superabsorbent binder polymer composition to be formed by coating the water-soluble precursor polymer onto the substrate and then removing the water to activate the latent crosslinker.

In addition to monomers capable of co-polymerization that contain a trialkoxysilane functional group, it is also feasible to use a monomer capable of co-polymerization that can subsequently be reacted with a compound containing a trialkoxysilane functional group or a moiety that reacts with water to form a silanol group can also be used. Such a monomer may contain, but is not limited to, an amine or an alcohol. An amine group incorporated into the co-polymer may subsequently be reacted with, for example, but not limited to, (3-chloropropyl)trimethoxysilane. An alcohol group incorporated into the co-polymer may subsequently be reacted with, for example, but not limited to tetramethoxysilane.

The amount of organic monomer having trialkoxysilane functional groups or silanol-forming functional groups relative to the weight of the polymeric binder composition may range from about 0.1% to about 15% by weight. Suitably, the amount of monomer should exceed 0.1% by weight in order provide sufficient crosslinking upon exposure to moisture. In some aspects, the monomer addition levels are between about 0.1% and about 20% by weight of the flexible superabsorbent binder polymer composition, such as, between about 0.5% and about 10% by weight of the flexible superabsorbent binder polymer composition; or between about 0.5% and about 5% by weight of the flexible superabsorbent binder polymer composition for some intended uses. The flexible superabsorbent binder polymer composition can include a copolymerizable hydrophilic glycol containing an ester monomer, for example a long chain, hydrophilic monoethylenically unsaturated esters, such as poly (ethylene glycol) methacrylate having from 1 to 13 ethylene glycol units. The hydrophilic monoethylenically unsaturated esters have the following structure:

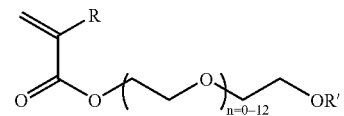

R=H or CH$_3$

R'=H, alkyl, phenyl

The amount of monoethylenically unsaturated hydrophilic esters relative to the weight of the polymeric binder composition thereof may range from 0 to about 75% by weight of monomer to the weight of the flexible superabsorbent binder polymer composition. In some aspects, the monomer addition levels are between about 10% and about 60% by weight of the flexible superabsorbent binder polymer composition; such as between about 20% and about 50% by weight of the flexible superabsorbent binder polymer composition; or between about 30% and about 40% by weight of the flexible superabsorbent binder polymer composition for some intended uses.

In some aspects, the flexible superabsorbent binder polymer composition may also include a hydrophilic plasticizer. Suitable hydrophilic plasticizers that may be used include, but are not limited to a polyhydroxy organic compounds such as glycerin, and low molecular weight polyolefinic glycols such as polyethylene glycol (PEG) of molecular weight ranges from about 200 to about 10,000.

The amount of plasticizer relative to the weight of the flexible superabsorbent binder polymer composition thereof may range from 0 to about 75% by weight of plasticizer to the weight of the flexible superabsorbent binder polymer composition. In some aspects, the plasticizer addition levels are from about 10% to about 60% by weight of the flexible superabsorbent binder polymer composition; such as from about 10% to about 40% by weight of the flexible superabsorbent binder polymer composition for some intended uses.

In some aspects, the flexible superabsorbent binder polymer composition of the present invention may be made from monomers that include at least 15% by weight monoethylenically unsaturated monomer selected from carboxylic acid, carboxylic acid salts, sulphonic acid, sulphonic acid salts, phosphoric acid, or phosphoric acid salts; an initiator system; and an acrylate or methacrylate ester that contains a group readily transformed into a silanol functionality by subsequent reaction with water, wherein said the resulting flexible superabsorbent binder polymer composition has an average molecular weight of from about 100,000 to about 650,000 g/mole, such as about 100,000 to about 300,000 g/mole, and the superabsorbent polymer composition has a viscosity of less than about 10,000 cps and a residual monoethylenically unsaturated monomer content of less than about 1000 ppm.

One advantage of the flexible superabsorbent binder polymer composition of the present invention is that it provides a water-soluble ionic polymer capable of sufficient spontaneous crosslinking within about 10 minutes, such as less than about 5 minutes, or less than about 1 minute, at a web temperature not more than about 150° C., to provide the flexible absorbent binder layer with an absorbent capacity of at least one (1) gram of fluid per gram of flexible superabsorbent binder polymer composition, such as at least three (3) grams of fluid per gram of flexible superabsorbent binder polymer composition, using the Centrifuge Retention Capacity Test (described below).

The crosslinking at web temperatures not more than about 150° C., such as not more than about 120° C., or not more than about 100° C., permits the flexible superabsorbent binder polymer composition to be applied to one or more substrate layers, and then crosslinked, without degrading or damaging the substrate. Significant crosslinking occurs within about 10 minutes, such as within about 8 minutes, or within about 6 minutes to provide an efficient, commercially feasible, cost-effective crosslinking process. The crosslinking may then continue until a flexible superabsorbent binder polymer composition having the desired absorbent capacity is obtained. The ionic polymer may bear a positive charge, a negative charge, or a combination of both, and should have an ionic unit content of about 15 mole % or greater. The ionic polymer may include a variety of monomer units described below.

The superabsorbent polymer composition may be prepared by adding an initiator system to a solution of the above monomers, at a suitable temperature, for thermal initiators to generate free radicals, for example, temperatures between about 50° C. and about 90° C. Lower temperatures can be used for redox initiator systems. An initiator system may be prepared by dissolving an initiator in a solvent. Initiators are used to start the polymerization of a monomer. The action of an initiator is similar to that of a catalyst, except that the initiator is generally consumed in the reaction. Possible solvents include, but are not limited to water, and alcohols such as ethanol. A variety of initiators may be useful in the practice of this invention. The polymerization initiator system may be activated using a variety of methods including, but not limited to, thermal energy, radiation, redox chemical reactions, thermal initiators and other methods known in the art. One suitable class of initiators is organic peroxides and azo compounds, with benzoyl peroxide and azobisisobutyronitrile (AIBN), as examples. Examples of suitable initiators include t-amylperoxypivalate, 2,2'-Azobis(2,4'-dimethylvaleronitrile) (V65B), sodium persulfate (NAPS); and 2,2'-azobis-2-amidinopropanedihydrchloride (ABAH). Suitable amounts of initiators depend upon the particular initiator. Examples include, but are not limited to at least about 0.003 mol/mol of t-amylperoxypivalate; at least about 0.01 mol/mol of 2,2'-Azobis(2,4'-dimethylvaleronitrile); at least about 200 ppm of sodium persulfate; and at least about 200 ppm of 2,2'-azobis-2-amidinopropanedihydrchloride.

Compounds containing an O—O, S—S, or N=N bond may be used as thermal initiators. Compounds containing O—O bonds; i.e., peroxides, are commonly used as initiators for polymerization. Examples of peroxide initiators include: alkyl, dialkyl, diaryl and arylalkyl peroxides such as cumyl peroxide, t-butyl peroxide, di-t-butyl peroxide, dicumyl peroxide, cumyl butyl peroxide, 1,1-di-t-butyl peroxy-3,5,5-trimethylcyclohexane, 2,5-dimethyl-2,5-di(t-butylperoxy)hexane, 2,5-dimethyl-2,5-bis(t-butylperoxy)hexyne-3 and bis(a-t-butyl peroxyisopropylbenzene); acyl peroxides such as acetyl peroxides and benzoyl peroxides; hydroperoxides such as cumyl hydroperoxide, t-butyl hydroperoxide, p-methane hydroperoxide, pinane hydroperoxide and cumene hydroperoxide; peresters or peroxyesters such as t-butyl peroxypivalate, t-amylperoxypivalate, t-butyl peroctoate, t-butyl perbenzoate, 2,5-dimethylhexyl-2,5-di(perbenzoate) and t-butyl di(perphthalate); alkylsulfonyl peroxides; dialkyl peroxymonocarbonates; dialkyl peroxydicarbonates; sodium persulfate, 2,2'-Azobis(2,4'-dimethylvaleronitrile), 2,2'-azobis-2-amidinopropanedihydrchloride. diperoxyketals; ketone peroxides such as cyclohexanone peroxide and methyl ethyl ketone peroxide. In one particular aspect of the present invention, an organic initiator, t-amylperoxypivalate (TAPP) that decomposes very fast to form a stable ethyl ($CH_3CH_2$.) free radical was utilized to reduce the residual monoethylenically unsaturated monomer significantly.

A redox initiator system where free radicals are generated by oxidation-reduction reactions without the application of heat can be used for the polymerization of the monomer solution to make the flexible superabsorbent binder polymer composition. In this method, polymerization is started by adding either one of oxidizing or reducing components of the initiator system to the rest of the solution mixture of monomers and other components of the redox initiator system. Suitable oxidizing components of the redox initiator system include, but are not limited to hydrogen peroxide, alkali metal persulfates, ammonium persulfate, alkalihydroperoxides, peresters, diacryl peroxides, silver salts and combinations thereof. Suitable reducing components of the initiator system include, but are not limited to, ascorbic acid, alkali metal sulfites, alkali metal bisulfites, ammonium sulfite, ammonium bisufite, alkali metal hydrogen sulfites, ferrous metal salts such as ferrous sulfates, sugars, aldehydes, primary and secondary alcohols, and combinations thereof. A combination of redox and thermal initiators can also be used. A redox initiator system that comprises hydrogen peroxide, ferrous sulfate and ascorbic acid coupled with thermal initiator sodium persulfate (NAPS) was found to be able to reduce residual monoethylenically unsaturated monomer significantly in aqueous polymerization of the present invention while yielding weight average molecular weight of superabsorbent polymer in the target range of about 100,000 to about 650,000 g/mole, such as about 1000,000 to about 300,000 g/mole.

A chain transfer agent that can limit the polymer chain growth during the polymerization and thereby can control the molecular weight and viscosity of flexible binder polymer solution can additionally be used in the polymerization solution. Suitable chain transfer agents include, but are not limited to, alcohols such as isopropyl alcohol, organic acids such as formic acid, inorganic acids such as hypophosphorus acid, organic amines such as triethylamine and combinations thereof. In one aspect, hypophosphorus acid was found to be an effective chain transfer agent for the flexible superabsorbent binder polymer composition.

The amount of chain transfer agent relative to the weight of monoethylenically unsaturated carboxylic, sulphonic or phosphoric acid or salts monomers may range from 0.1 to about 20% by weight of the chain transfer agent to the weight of the monomers. In some aspects, the chain transfer agent addition levels are between about 5% and about 15% by weight of the monomer such as between about 2% and about 10% by weight of the monomer; or between about 0.5% and about 1% by weight of the monomer to obtain desired molecular weight and viscosity levels of the flexible superabsorbent binder polymer composition for some intended uses.

The method to make the flexible superabsorbent polymer composition of the present invention may further include a transition metal salt. Examples of some suitable transition metals for the transition metal salt include, but are not limited to, scandium, titanium, vanadium, chromium, manganese, iron, cobalt, nickel, copper, zinc, silver, and the like. For instance, a transition metal salt may be combined with the flexible superabsorbent binder polymer compositions before, during, and/or after its formation. For instance, some transition metal salts that may be used in the present invention include, but are not limited to, halides, such as iron chloride, copper chloride, sulfates, nitrates, acetates, oxalates, carbonates, and so forth. Iron sulfate may be used in the present invention.

The flexible superabsorbent binder polymer composition of the present invention may be applied to a substrate, such as for the purpose of adhering various components of an absorbent product to one another during the manufacturing process of absorbent products. Alternatively, the superabsorbent polymer composition may be applied to a substrate as a coating by itself, thereby serving as an absorbency additive. The flexible superabsorbent binder polymer composition may be applied to the substrate using any suitable application process, including knife over roll coating, or roll coating, either in a continuous coverage or a patterned coverage. Printing applications are other suitable application techniques, including gravure printing, screen, and jet printing. The flexible superabsorbent binder polymer composition may also be applied to the substrate using a spray application.

In some aspects of the present invention, a new source of crosslinking having silanol functionality may be added to the superabsorbent binder polymer composition just before the concentrated solution is applied to a substrate. The added source of silanol crosslinking functionality may in effect "activate" the solution for gellation as it is being applied to the substrate. Potential sources of silanol (Si—OH) functionality include, but are not limited to: silica nano particles, such as SNOWTEX® ST-40 (available from Nissan Chemical—America Corporation, a business having offices located in Houston, Tex., U.S.A.); silica aerosol particles, such as SYLOID® silica (available from Grace Davison, a division of W.R. Grace & Co., having a place of business in Columbia. Md., U.S.A.); clays with Si—OH surface, such as Kaolin, bentonite, or attapolgite: and zeolites. In addition, soluble sources of silanol can be added, such as silicates, or in the form of monomeric silanes that are readily hydrolyzed to silanols, such as, but not limited to alkoxysilanes; for example, tetraethoxy silane (TEOS).

The source of silanol can be added in any suitable manner to provide sufficient mixing with the flexible superabsorbent binder polymer composition solution prior to coating onto the substrate. For example, two separate, metered, feed streams of the flexible superabsorbent binder polymer solution and silanol source may be combined at a Y-juncture with a down-stream static mixer in the flow line to provide mixing.

Suitable ranges may be any that provide for a stable solution at a polymer concentration greater than 25%. Alkoxysilane functionality is incorporated into a base flexible binder polymer solution at an acrylate to silane mole ratio of 170:1. Flexible superabsorbent binder polymer composition with 75%, 50% and 25% of a base flexible binder polymer solution incorporation have been prepared. (Mole ratios of acrylate to silane in these polymers are 227:1, 340:1, and 680:1).

Table 1 below shows the absorbent capacity data, based on the Centrifuge Retention Capacity Test (described below):

| Polymer composition | CRC g/g |
|---|---|
| Standard FAB: acrylate: Si—OH ratio 56:1 | 14.2 |
| 50% reduced alkoxysilane: acrylate to Si—OH ratio 112:1 | 21.4 |
| 50% reduced alkoxysilane: with kaolin added to reduce acrylate to Si—OH ratio to 20:1 | 15.1 |

-continued

| Polymer composition | CRC g/g |
|---|---|
| 50% reduced alkoxysilane: with syloid silica added to reduce acrylate to Si—OH ratio to 20:1 | 14.6 |
| 50% reduced alkoxysilane: with tetraethoxy silane added to reduce acrylate to Si—OH ratio to 20:1 | 17.1 |

As demonstrated in the Table 1, reducing the alkoxysilane incorporation increased the Centrifuge Retention Capacity (CRC) due to lower crosslink density, compared to a base flexible superabsorbent binder polymer composition. Addition of sources of silanol, even to levels greater than a base flexible superabsorbent binder polymer composition, provides a higher CRC than a base flexible superabsorbent binder polymer composition, even with higher crosslinking potential. Once the flexible superabsorbent binder polymer composition is applied to the substrate, crosslinking can be moisture-induced by hydrolysis and condensation of alkoxysilanes. Activation by this method can take place during solvent removal or after solvent removal by exposure to air at ambient humidity. Solvent may be removed from the substrate either by evaporating the solvent or by any other suitable technique. Heat or radiation may be applied to increase the rate of the process. Recovery of the solvent is a part of the process and methods for this are widely known to those skilled in the art.

In addition, modifying agents such as compatible polymers, plasticizers, colorants, and preservatives may be incorporated in the flexible superabsorbent binder polymer composition of the present invention.

In some aspects of the present invention, the flexible superabsorbent binder polymer composition of the present invention may be prepared in an aqueous solution by the process comprising the steps of a) preparing a aqueous monomer solution including a plasticizer, a component of a redox initiator system, thermal initiator, a crosslinking monomer that contains an alkoxysilane functionality, a chain transfer agent; monoethylenically unsaturated monomer, including acid groups that are neutralized to at least 25 mol %; b) initiating the monomer solution mixture of step a) to polymerize said monomer solution mixture of a) to at least 50% degree of neutralization; c) adding a second monomer solution comprising ; monoethylenically unsaturated monomer, including acid groups that are neutralized to at least 25 mol % and optionally the remaining elements of step a) to the polymerization solution of step b); d) polymerizing the solution of step c); and e) optionally neutralizing the polymer of step d) to form a flexible superabsorbent binder polymer composition having an average molecular weight of from about 100,000 to about 650,000 g/mole, and the composition has a viscosity after 16 hours of less than about 10,000 cps and a residual monoethylenically unsaturated monomer content of less than about 1000 ppm. Furthermore, the flexible superabsorbent binder polymer composition may have a solids content of at least about 24% by weight.

In other aspects of the present invention, the flexible superabsorbent binder polymer composition of the present invention may be prepared in an aqueous solution by the process including the steps of: a) preparing an initiator system solution; b) preparing a monomer solution including monoethylenically unsaturated monomers, one of which includes an alkyloxysilane functionality; c) mixing the initiator system and the monomer solution to form a polymerization solution; d) heating the polymerization solution to promote a reaction of the polymerization solution; e) cooling the polymerization solution; and f) neutralizing the polymer of step e) to at least about 25 mole % to form a flexible superabsorbent binder polymer composition, the dry polymer of which a residual monoethylenically unsaturated monomer content has less than about 1000 ppm. In addition, the polymer composition may have a weight average molecular weight of from about 100,000 to about 650,000 g/mole, such as from about 100,000 to about 300,000 g/mole, and/or a viscosity after 16 hours of less than about 10,000 cps. Furthermore, the flexible superabsorbent binder polymer composition may have a solids content of at least about 24% by weight.

In still other aspects of the present invention, the flexible superabsorbent binder polymer composition of the present invention may be prepared in an aqueous solution by the process including the steps of: a) preparing a monomer solution including an initiator system that includes one component of a redox initiator; a chain transfer agent; a plasticizer; a cross-linker monomer that contains an alkoxysilane functionality; and monoethylenically unsaturated monomers, one of which includes a functionality wherein the acid groups are neutralized to at least 25 mole %; b) adding another component of the redox initiator to the monomer solution mixture of step a) to polymerize the monomer solution mixture of a); c) cooling the polymerization solution to a temperature less than 30° C.; d) adding a similar solution mixture of step a) to the polymerization solution of step c); e) adding a transition metal salt to the solution of step d); f) polymerizing the solution of step e); and g) optionally neutralizing the polymer of step f) to form a flexible superabsorbent binder polymer composition having a average molecular weight of from about 100,000 to about 650,000 g/mole, such as from about 100,000 to about 300,000 g/mole, and/or the superabsorbent polymer composition having a viscosity after 16 hours of less than about 10,000 cps and/or a residual monoethylenically unsaturated monomer content of less than about 1000 ppm. Furthermore, the flexible superabsorbent binder polymer composition may have a solids content of at least about 24% by weight.

The flexible superabsorbent binder polymer composition can be used in the manufacture of absorbent products, thereby adding absorbent capacity to such absorbent products. Examples of such articles include training pants, diapers, diaper pants, feminine hygiene products including sanitary pads and napkins, as well as tampons and interlabial feminine hygiene products, swimwear, incontinence products, absorbent toweling, other personal care or health care garments, including medical garments, or the like. As used herein, the term "incontinence products" includes absorbent underwear for children, absorbent garments for children or young adults with special needs such as autistic children or others with bladder/bowel control problems as a result of physical disabilities, as well as absorbent garments for incontinent older adults.

The present invention may be better understood with reference to the following examples.

Test Procedures

Residual Monoethylenically Unsaturated Monomer Test

The residual monoethylenically unsaturated monomer analysis is carried out using solid film obtained from the polymer solution or superabsorbent composition. By way of example for this test description, the monoethylenically unsaturated monomer is acrylic acid. High performance liquid chromatography (HPLC) with a SPD-10Avp Shimadzu UV detector (available from Shimadzu Scientific Instruments, having a place of business in Columbia, Md., U.S.A) is used to determine the residual acrylic acid monomer content. To determine the residual acrylic acid monomer, about 0.5 grams of cured film is stirred in 100 ml of a 0.9% NaCl-solution for 16 h using a 3.5 cm L×0.5 cm W magnetic stirrer bar at 500 rpm speed. The mixture is filtered and the filtrate is then passed through a Nucleosil C8 100A reverse phase column (available from Column Engineering Incorporated, a business having offices located in Ontario, Calif., U.S.A.) to separate the acrylic acid monomer. The acrylic acid monomer elutes at a certain time with detection limit at about 10 ppm. The peak area of resulting elutes calculated from the chromatogram is then used to calculate the amount of residual acrylic acid monomer in the film. Initially, a calibration curve was generated by plotting the response area of pure acrylic acid elutes against its known amount (ppm). A linear curve with a correlation coefficient of greater than 0.996 was obtained.

16 Hr Extractable Test (%)

The following test methods are used to calculate the 16-hour extractable levels for the superabsorbent composition. The first test method is intended for use on carboxylic acid based superabsorbent materials. About 0.5 g of cure film obtained from the polymer solution is placed into a 250 ml conical flask containing 100 ml 0.9% NaCl solution. The mixture was stirred with a 3.5 cm L×0.5 cm W magnetic stirrer bar at 500 rpm speed for 16 hours. The sample is then filtered using WHATMAN #3 filter paper (available from Whatman, Inc., a business having offices located in Florham Park, N.J., U.S.A.) and an aspirator attached to a water faucet that creates a vacuum in the filtration unit by sucking air with running water. The entire solution is filtered and special care is taken to ensure that no fluid is lost and that no solid material passes through or around the filter paper. About 50 g the filtered solution is then taken into a 100 ml beaker. The pH of the solution is adjusted to 8.5 stepwise by using 1.0N NaOH and 0.1N HCl. The resulting solution is titrated to pH 3.9 using the Brinkman Titoprocessor (available from Brinkmann Instruments, Inc., a business having offices located in Westbury, N.Y., U.S.A.). The results are calculated by weight basis, with a assumed sodium/hydrogen acrylate formula weight of 87.47. The formula weight is derived from that of 70% neutralized acrylic acid.

Centrifuge Retention Capacity (CRC) Test

As used herein, the Centrifugal Retention Capacity (CRC) is a measure of the Absorbent Capacity of the superabsorbent polymer composition retained after being subjected to centrifugation under controlled conditions. The CRC can be measured by placing a sample of the material to be tested into a water-permeable bag that will contain the sample while allowing the test solution (0.9 percent NaCl solution) to be freely absorbed by the sample. A heat-sealable tea bag material (available from Dexter Nonwovens of Windsor Locks, Conn., U.S.A., as item #11697) works well for most applications. The bag is formed by folding a 5-inch by 3-inch sample of the bag material in half and heat sealing two of the open edges to form a 2.5-inch by 3-inch rectangular pouch. The heat seals should be about 0.25 inch inside the edge of the material. After the sample is placed in the pouch, the remaining open edge of the pouch is also heat-sealed. Empty bags are also made to be tested with the sample bags as controls. A sample size is chosen such that the teabag does not restrict the swelling of the material, generally with dimensions smaller than the sealed bag area (about 2-inch by 2.5-inch). Three sample bags are tested for each material.

The sealed bags are submerged in a pan of 0.9 percent NaCl solution. After wetting, the samples remain in the solution for 60 minutes, at which time they are removed from the solution and temporarily laid on a non-absorbent flat surface.

The wet bags are then placed into the basket of a suitable centrifuge capable of subjecting the samples to a g-force of 350. (A suitable centrifuge is a Heraeus LABOFUGE 400, Heraeus Instruments, part number 75008157, available from Heraeus Infosystems GmbH, Hanau, Germany). The bags are centrifuged at a target of 1600 rpm, but within the range of 1500-1900 rpm, for 3 minutes (target g-force of 350). The bags are removed and weighed. The amount of fluid absorbed and retained by the material, taking into account the fluid retained by the bag material alone, is the Centrifugal Retention Capacity of the material, expressed as grams of fluid per gram of material.

Viscosity After 16 Hours

Viscosity of the flexible binder polymer solution is measured using a Brookfield DVII+ Programmable viscometer (available from Brookfield Engineering, a business having offices located at Middleboro, Mass., U.S.A.). About 200-250 ml of binder composition is taken in a 25-ounce plastic cup. The viscometer is generally zeroed initially with a desired Spindle. For binder composition, Spindle Number 3 is used. The viscosity is measured at 20 RPM and at temperature 22±1° C.

Percent Solids

About 20±0.5 g of flexible superabsorbent binder polymer composition is accurately weighed (W1) into a tared (W2) hexagonal plastic weighing dish. Approximate internal diameter (ID) of weighing dish is 5 inch/3.5 inch (Top/Base). The polymer composition-containing dish is placed in a fuming hood at room temperature for about 16-20 hours. The dish containing partially dried solid film is then placed into a laboratory oven pre-heated at 80° C. for 30 minutes. The dish and its content are allowed to cool to room temperature. The dried dish with resulting solid film is then weighed together (W3). The percent solids is calculated using the following formula:

% Solids=[($W3-W2$)/($W1-W2$)]×100

EXAMPLES

Comparative Example 1

A 2 L glass, jacketed reactor is initially purged with nitrogen. A circulating heater bath is equilibrated to 75° C. In a 500 mL Erlenmeyer flask, the initiator system was prepared by dissolving benzoyl peroxide(BPO) (0.7105 g, $2.93\times10^{-3}$ moles) in 250 mL of ethanol (Mallinckrodt®, completely denatured available from Mallinckrodt Laboratory Chemicals, a division of Mallinckrodt Baker, Inc., a business having offices located in Phillipsburg, N.J. U.S.A.). In a 1 L pear-shaped flask, the monomer solution is prepared by mixing acrylic acid (56 mL, 0.817 moles), di(ethylene glycol) methyl ether methacrylate (62 mL, 0.336 moles) and 3-(trimethoxysilyl)propyl methacrylate (2.8 mL, $1.18\times10^{-2}$) in 565 mL of ethanol (Mallinckrodt®, completely denatured). Nitrogen was bubbled through the dissolved initiator system for 5 minutes, and the solution was transferred to the reactor. A positive pressure of nitrogen is maintained on the reactor. After the nitrogen was bubbled through the monomer solution for 5 minutes, a 12 inch needle connected to the inlet port of a Masterflex® peristaltic pump (available from Cole-Parmer Instrument Company, a business having offices located in Vernon Hills, Ill., U.S.A.) was placed into the monomer solution. The outlet port of the Masterflex® pump was connected to a 12 inch needle which was inserted into the jacketed reactor. A positive pressure of nitrogen was maintained on the monomer flask. The initiator system was heated to 75° C. with stirring by connecting the jacketed reactor to the circulating bath. When the internal temperature reached 60° C., the monomer solution was added at a rate of about 3 g/min to the initiator system. The polymerization solution was stirred and heated at 75° C. for approximately 2 hours at which time a solution of azobisisobutyronitrile (AIBN) (0.1954 g, $1.19\times10^{-3}$ moles) in 20 mL of ethanol is added. Stirring and heating at 75° C. was continued for an additional hour at which time a second solution of AIBN (0.1931 g, $1.18\times10^{-3}$ moles) in 20 mL of ethanol was added to the polymerization solution. Stirring and heating at 75° C. was continued for an additional hour at which time a third solution of AIBN (0.1945 g, $1.18\times10^{-3}$ moles) in 20 mL of ethanol was added to the polymerization solution. Stirring and heating was continued at 75° C. for a total reaction time of about 5 hours. The reactor was cooled to 35° C. in over 30 min and the solution was drained into a 2 L plastic container.

To obtain about 70 mol % degree of neutralization for acrylic acid content of the resulting polymer solution, an aqueous solution of sodium hydroxide (6.59 sodium hydroxide pellets dissolved in 40.8 g deionized (DI) water) was slowly added to 240 g of binder solution with constant stirring. The residual acrylic acid monomer was determined on films by using the Residual Monoethylenically Unsaturated Monomer Test method disclosed herein and was found to be 51,143. The CRC was using the CRC Test method disclosed herein and was found to be 9.3 g/g. The 16-hour extractables were also measured using the 16-Hr Extractables Test method disclosed herein and was found to be 15.3%.

Comparative Example 2

This comparative example was prepared using the following process. Solution No. 1 was prepared as follows. To 237 grams (3.289 moles) of acrylic acid was added to 31.5 grams polyethylene glycol (mol. wt.=200) and 52.6 grams of sodium hydroxide in 350 grams of water (40% neutralization) and 1.5 grams of ascorbic acid. This solution was cooled in an ice bath.

Solution No. 2 was prepared as follows: 31.5 grams polyethylene glycol (mol. wt.=200) was diluted with 200 g water, then, with rapid stirring 5 ml of 3-(trimethoxysilyl) propyl methacrylate($2.7\times10^{-2}$ moles) was added to produce a hazy solution; then 3.15 g of 30% aqueous hydrogen peroxide was added to the solution.

Solution No. 3 was prepared by dissolving 39.5 grams (0.987moles) sodium hydroxide in 300 grams of water.

Solution No. 2 was added to Solution No. 1 in an ice bath while stirring with a magnetic stir bar. A thermocouple was used to monitor the temperature and observe the reaction exotherm. The polymerization reaction began after about 5 minutes of mixing. Once the exotherm reaction was detected, water was added gradually to keep the solution viscosity suitable for stirring. A total of 450 gram of water was added over 20 minutes. A maximum polymerization temperature of 85° C. was observed about 8 minutes after mixing of the two monomer solutions. After about 20 minutes Solution No.3 was added with stirring to bring neutralization to 70%, followed by additional water to reduce the polymer concentration to about 20%.

The resulting aqueous binder composition was cast into a film by pouring 22.6 grams of solution into a polystyrene weigh boat and allowing the water to evaporate overnight in a hood at room temperature, followed by drying a Model No. DK-63 laboratory oven (available from Scientific Products, a division of Allegiance Healthcare Corporation, a business having offices located in McGraw Park, Ill. U.S.A.) at 50° C. for 50 minutes. The resulting film weighed 5.95 grams, indicating a solution concentration of about 26%.

Comparative Example 2 resulted in the following properties: CRC of 11.9 g/g, residual acrylic acid monomer of 5852 ppm and 16-hour extractables of 7.1%.

Example 1

A 1 L glass, jacketed reactor equipped with a thermometer and a mechanical stirrer system is initially purged with nitrogen. In a 500 mL Erlenmeyer flask, an initiator system is prepared by dissolving 2,2'-Azobis(2,4'-dimethylvaleronitrile)(V65B) (moles given in Table 2 below) in 125 mL of ethanol (Mallinckrodt®, completely denatured). In a 1 L beaker, the monomer solution is prepared by mixing acrylic acid (28 mL, 0.4085 moles), di(ethylene glycol) methyl ether methacrylate (31 mL, 0.168 moles) and 3-(trimethoxysilyl)propyl methacrylate (1.4 mL, 0.59×10$^{-2}$) in 283 mL of ethanol (Mallinckrodt®, completely denatured). After nitrogen was bubbled through the dissolved initiator system as well as through the solution of monomer mixture for 5 minutes, both solutions were transferred to the reactor. A positive pressure of nitrogen was maintained on the reactor.

The reactor content was then heated to 55° C. under constant stirring at a modest speed. The reaction was continued for two hours. Then the reactor temperature was raised to 70° C. and a solution of t-amylperoxypivalate (TAPP)(moles given in Table 1) in 10 mL of ethanol was added. Stirring and heating at 70° C. was continued for two additional hours. The total polymerization time was about 4 hours. The reactor is cooled to about 35° C. over 30 min and the solution was drained into a 2 L plastic container. To obtain a 70 mol % degree of neutralization for the acrylic acid content of the resulting polymer solution, an aqueous solution of sodium hydroxide (6.59 sodium hydroxide pellets dissolved in 40.8 g deionized (DI) water) was slowly added to 240 g of binder solution with constant stirring. The results of Example 1 are shown in Table 2 below.

Examples 2-6

Thermally decomposable initiators including sodium persulfate (NAPS), and 2,2'-azobis-2-amidinopropanedihydrchloride(ABAH) are included in addition to the redox initiator system in the amounts set forth in Table 3 below. Three solutions were prepared separately.

Solution No. 1 was prepared as follows: to 237 grams (3.289 moles) of acrylic acid was added to 31.5 grams polyethylene glycol (mol. wt.=200) and 52.6 grams of sodium hydroxide in 350 grams of water (40% neutralization) and 1.5 grams of ascorbic acid. This solution was cooled in an ice bath.

Solution No. 2 was prepared as follows: 31.5 grams polyethylene glycol (mol. wt.=200) was diluted with 200 g water, then, with rapid stirring 5 ml of 3-(trimethoxysilyl)propyl methacrylate(2.7×10$^{-2}$ moles) was added to produce a hazy solution; then 3.15 g of 30% aqueous hydrogen peroxide was added to this solution.

Solution No. 3 was prepared by dissolving 39.5 grams (0.987moles) sodium hydroxide in 300 grams of water.

Solution No. 2 was added to Solution No. 1 in an ice bath while stirring with a magnetic stir bar. A thermocouple was used to monitor the temperature and observe the reaction exotherm. The polymerization reaction began after about 5 minutes of mixing. Once the exotherm reaction was detected, water was added gradually to keep the solution viscosity suitable for stirring. A total of 450 grams of water was added over 20 minutes. A maximum polymerization temperature of 75° C. was observed about 8 minutes after mixing of the two monomer solutions. After about 20 minutes Solution No. 3 was added with stirring to bring the neutralization to 70%, followed by additional water to reduce the polymer concentration to about 20%.

The resulting aqueous binder composition was cast into a film by pouring 22.6 grams of solution into a polystyrene weigh boat and allowing the water to evaporate overnight in a hood at room temperature, followed by drying a Model No. DK-63 laboratory oven at 50° C. for 50 minutes. The resulting film weighed 5.95 grams, indicating a solution concentration of about 26%.

TABLE 2

| | | Example 1 | | | | | |
|---|---|---|---|---|---|---|---|
| Example | Initiator Package | Reaction Time (hrs) | Reaction Temperature ° C. | Degree of Neutralization (mol %) | CRC (g/g) | Residual Monomer (ppm) | 16 hour extr. (%) |
| 1 | V65B (0.1 mol/mol) | 2 | 55 | 70 | 12.9 | 428 | 28.2 |
| | TAPP (0.0043 mol/mol) | 2 | 70 | | | | |

The results of Examples 2-6 are shown in Table 3 below.

TABLE 3

Examples 2-6

| Example | $H_2O_2$ ppm | ASC ppm | NAPS ppm | ABAH ppm | CRC (g/g) | Residual acrylic acid monomer (ppm) | 16 hr extract (%) |
|---|---|---|---|---|---|---|---|
| 2 | 755 | 1199 | 600 | 600 | 11.9 | 557 | 22.1 |
| 3 | 755 | 1199 | 800 | 800 | 11.7 | 689 | 9.2 |
| 4 | 755 | 1199 | 400 | 400 | 10.9 | 697 | 10.2 |
| 5 | 755 | 1199 | 600 | none | 12.7 | 466 | 27.7 |
| 6 | 755 | 1199 | 800 | none | 11.2 | 235 | 29.1 |

The data in Table 3 shows that all of the thermal initiators decrease the residual acrylic acid monomer of the Flexible Superabsorbent Binder Polymer Composition preparations to below 1,000-ppm.

Examples 7-11

An aqueous solution of NaOH was prepared to obtain approximately 40% degree of neutralization for desired amount of acrylic acid monomer by diluting 105.2 g of 50% aqueous NaOH in 1000 g of water. This solution was cooled in an ice bath. An acrylic acid/PEG200 (polyethylene glycol, mol. wt.=200) was prepared by adding 237 g of glacial acrylic acid to 63.0 g PEG200 and mixed for about 5 minutes. This mixture was added to the NaOH solution and the resulting solution was cooled in an ice bath.

Initiator systems were prepared by dissolving 1.5 g ascorbic acid in 50 g deionized (DI) water, 1.0 g NAPS in 50 g DI water, and 2.7 g of 35% $H_2O_2$ was diluted with 50 g DI water. The latent crosslinker solution was prepared just prior to initiation. With rapid stirring 2.5 ml of 3-(trimethoxysilyl)propyl methacrylate (MEMO) was added to 100 g DI water producing a hazy solution. When the monomer solution reached 20° C. the initiation sequence began. The monomer solution was removed from the ice bath prior to initiation. No further cooling was used in the rest of the polymerization process. The hydrogen peroxide solution, the NAPS solution, the crosslinker solution, and finally the ascorbic acid solution was added to the monomer solution. A thermometer was used to monitor the temperature and observe the reaction exotherm. The polymerization reaction began almost immediately once the initiator solutions were mixed under medium pace stirring with a mechanical power-stirrer. The reaction was allowed to proceed for 25 minutes. Then 79.0 g of 50% NaOH solution was added to post-neutralize the polymer solution to a final degree of neutralization of 70%.

The cross-linker, MEMO was reduced by 50% in the above procedure. The amounts of sodium hydroxide and acrylic acid were varied to obtain various solid levels. The results are summarized in Table 4 below.

TABLE 4

Examples 7-11

| Sample ID | Acrylic Acid (% wt TMS) | % Solids film | CRC (g/g) | Residual acrylic acid monomer (ppm) | 16 hr Extr (%) | Viscosity After 16 hours (cPs) |
|---|---|---|---|---|---|---|
| 7 | 13.9 | 24.7 | 17.4 | 619 | 40.7 | 573 |
| 8 | 14.8 | 25.7 | 17.2 | 672 | 40.3 | 571 |
| 9 | 16.9 | 29.2 | 18.0 | 617 | 32.4 | 1700 |
| 10 | 16.9 | 30.6 | 13.8 | 283 | 23.6 | 7250 |
| 11 | 18.2 | 32.9 | 14.2 | 267 | 34.0 | 4420 |

Examples 12-15

In conjunction with Table 5 below for specific amounts of $H_2O_2$, Ascorbic Acid, Hypophosphorus Acid, the following is the procedure for Examples 12-15:

Into a 1-gallon plastic bucket about 626.8 g water was added. To this water, 118.5 g of glacial acrylic acid was added. Then 52.8 g of 50% aqueous NaOH and 31.5 g PEG 200 were added. This solution mixture was cooled to 20-22° C. while sparging with $N_2$ gas. No cooling water or ice bath was used.

Initiator solutions were prepared as follows: (1) 1.04 g ascorbic acid was dissolved in 21.3 g water;(2) 0.5 g NAPS (sodium persulfate) was dissolved in 2.9 g water; and (3) 1.93 g 35% $H_2O_2$ was weighed out.

A crosslinker solution was prepared just prior to initiation. With rapid stirring 1.4 mL of 3-(trimethoxysilyl)propyl methacrylate (MEMO) was added to 21.3 g water producing a hazy solution. When the monomer solution reached 20-22° C. the initiation sequence began. To the monomer solution were added the hydrogen peroxide solution, the NAPS solution, 1.16 g of 50% w/w hypophosphorous acid (chain transfer agent), the crosslinker solution, and finally the ascorbic acid solution. The solution was stirred at medium pace with a mechanical stirrer. A thermocouple was used to monitor the temperature and observe the reaction exotherm. When the reaction reached $T_{max}$ (~50-55° C.), 212.7 g water was added to the resulting polymer solution. The polymer solution was allowed to cool while stirring was continued. No cooling water or ice bath was used.

When the polymer solution reached 25-27° C., the remaining 118.5 g glacial acrylic acid, 52.8 g 50% aq. NaOH, and 31.5 g PEG 200 were added to the solution. This solution mixture was allowed to cool to 25-27° C. while sparging with $N_2$ gas. No cooling water or ice bath was used. The remaining initiator solutions were prepared by dissolving 1.04 g ascorbic acid in 21.3 g water; dissolving 0.5 g NAPS (sodium persulfate) in 2.9 g water; weighing out 1.93 g 35% $H_2O_2$; and dissolving 1 g $Fe(SO_4)_3 \cdot 7H_2O$ in 100 g water. Then 1.0 g of the 1% $FeSO_4$ solution was added to 5 g water.

The remaining crosslinker solution was prepared just prior to initiation. With rapid stirring 1.4 mL of 3-(trimethoxysilyl)propyl methacrylate (MEMO) was added to 21.3 g water producing a hazy solution. In the second initiation step, the hydrogen peroxide solution, the NAPS solution, 1.16 g of 50% w/w hypophosphorous acid, the crosslinker solution, the diluted iron sulfate solution, and finally the ascorbic acid solution were added to polymer/monomer solution mixture. The polymer/monomer solution mixture was stirred with a mechanical stirrer. A thermocouple was used to monitor the temperature and observe the reaction exotherm. The resulting polymer solution was allowed to cool after it reached its maximum temperature ($T_{max}$). No cooling water or ice bath was used. When the reaction solution reached 30° C., 78.5 g of 50% NaOH solution was added to post-neutralize the polymer solution to a final degree of neutralization of 70%. The resulting polymer solution was stirred to approximately 5 minutes after addition of NaOH.

The results are summarized in Table 5 below.

TABLE 5

Examples 12-15

| | Step 1 | | | Step 2 | | | | Solution Properties | | Film Properties | | |
|---|---|---|---|---|---|---|---|---|---|---|---|---|
| Sample ID | $H_2O_2$ ppm | Asc. Acid ppm | HPA % wt AA | $H_2O_2$ ppm | Asc. Acid ppm | HPA % wt AA | Fe ppm | Visc. cps | Mol. WtMw g/mol $10^3$ | RM ppm | % Sol | CRC g/g |
| 12 | 1375 | 766 | — | 1836 | 1020 | — | 12.2 | 5980 | 372305 | 656 | 30.6 | 14 |
| 13 | 1375 | 766 | — | 1836 | 1020 | 2 | 12.2 | 1334 | 157296 | 21 | 33.4 | 16.6 |
| 14 | 1375 | 766 | — | 1836 | 1020 | 1 | 13.2 | 1943 | 230894 | 70 | 31.7 | 11.4 |
| 15 | 1375 | 766 | 0.5 | 1375 | 766 | 0.5 | 6.8 | 1277 | 174922 | 202 | 34.8 | 13.9 |

TMS = Total Monomer Solution
Asc. A. = Ascorbic Acid
HPA = Hypo phosphorus Acid

It can be seen from Table 5 that Samples 10 and 11 exhibit very low residual monomer levels.

What is claimed is:

1. A flexible superabsorbent binder polymer composition comprising the reaction product of:
   a monomer solution including at least 15% by mass monoethylenically unsaturated monomer selected from carboxylic acid, carboxylic acid salts, sulphonic acid, sulphonic acid salts, phosphoric acid, or phosphoric acid salts;
   an acrylate or methacrylate ester that contains an alkoxysilane functionality;
   a copolymerizable hydrophilic glycol containing an ester monomer,
   an initiator system; and
   a neutralizing agent wherein the unsaturated monomer is neutralized to at least 25 mol %; and
   wherein the flexible superabsorbent binder polymer composition has a residual monoethylenically unsaturated monomer content of less than about 1000 ppm.

2. The flexible superabsorbent binder polymer composition of claim 1, wherein, upon exposure to water, the alkoxysilane functionality forms a silanol functional group which condenses to form a crosslinked polymer.

3. The flexible superabsorbent binder polymer composition of claim 1, wherein the monoethylenically unsaturated monomer comprises a carboxylic acid salt-containing monomer.

4. The flexible superabsorbent binder polymer composition of claim 1, wherein the acrylate or methacrylate ester comprises a monomer containing a trialkoxysilane functional group.

5. The flexible superabsorbent binder polymer composition of claim 4, wherein the monomer comprises at least one of methacryloxypropyl trimethoxy silane, methacryloxyethyl trimethoxy silane, methacryloxypropyl triethoxy silane, methacryloxypropyl tripropoxy silane, acryloxypropylmethyl dimethoxy silane, 3-acryloxypropyl trimethoxy silane, 3-methacryloxypropylmethyl diethoxy silane, 3-methacryloxypropylmethyl dimethoxy silane, 3-(trimethoxysilyl) propyl methacrylate, or 3-methacryloxypropyl tris(methoxyethoxy)silane.

6. The flexible superabsorbent binder polymer composition of claim 1 wherein the initiator system comprises an initiator selected from the group consisting of t-amylperoxypivalate, and 2,2'-Azobis(2,4'-dimethylvaleronitrile).

7. The flexible superabsorbent binder polymer composition of claim 1 wherein the copolymerizable hydrophilic glycol containing ester monomer is selected from the group consisting of di(ethylene glycol) methyl ether methacrylate and poly(ethylene glycol) methacrylate.

8. A flexible superabsorbent binder polymer composition comprising the reaction product of:
   at least 15% by mass monoethylenically unsaturated monomer selected from carboxylic acid, carboxylic acid salts, sulphonic acid, sulphonic acid salts, phosphoric acid, or phosphoric acid salts;
   a plasticizer;
   an acrylate or methacrylate ester that contains an alkoxysilane functionality;
   an initiator system; and
   a neutralizing agent;
   wherein the superabsorbent polymer has a residual monoethylenically unsaturated monomer content of less than about 1000 ppm.

9. The flexible superabsorbent binder polymer composition of claim 8, wherein the monoethylenically unsaturated monomer comprises a carboxylic acid salt-containing monomer.

10. The flexible superabsorbent binder polymer composition of claim 8 wherein the plasticizer is a polyhydroxy organic compound.

11. The flexible superabsorbent binder polymer composition of claim 8, wherein the plasticizer comprises between about 15% and about 40% by weight of the flexible superabsorbent binder polymer composition.

12. The flexible superabsorbent binder polymer composition of claim 8 wherein the initiator system comprises an initiator selected from sodium persulfate (NAPS); or 2,2'-azobis-2-amidinopropanedihydrchloride (ABAH).

13. The flexible superabsorbent binder polymer composition of claim 8 wherein said plasticizer is polyethylene glycol, said neutralizing agent is sodium hydroxide and said an acrylate or methacrylate ester that contains an alkoxysilane functionality is 3-(trimethoxysilyl)propyl methacrylate.

14. A flexible superabsorbent binder polymer composition comprising the reaction product of:
at least 15% by mass monoethylenically unsaturated monomer selected from carboxylic acid, carboxylic acid salts, sulphonic acid, sulphonic acid salts, phosphoric acid, or phosphoric acid salts;
a plasticizer;
an acrylate or methacrylate ester that contains an alkoxysilane functionality
a chain transfer agent;
an initiator system; and
neutralizing agent;
wherein said flexible superabsorbent binder polymer composition has an average molecular weight of from about 100,000 to about 650,000 g/mole, and the superabsorbent polymer composition has a viscosity after 16 hours of less than about 10,000 cps and a residual monoethylenically unsaturated monomer content of less than about 1000 ppm.

15. The flexible superabsorbent binder polymer composition of claim 14, wherein the acrylate or methacrylate ester comprises a monomer containing a trialkoxy silane functional group wherein the monomer is at least 0.1% by weight of the superabsorbent polymer composition.

16. The flexible superabsorbent binder polymer composition of claim 14 wherein the initiator system comprises an initiator selected from the group consisting of sodium persulfate (NAPS); and hydrogen peroxide.

17. The flexible superabsorbent binder polymer composition of claim 14 wherein said acrylate or methacrylate ester that contains an alkoxysilane functionality is 3-(trimethoxysilyl)propyl methacrylate.

18. The flexible superabsorbent binder polymer composition of claim 14 wherein the plasticizer is a polyhydroxy organic compound.

19. The flexible superabsorbent binder polymer composition of claim 14 wherein the plasticizer is a polyethylene glycol.

20. The flexible superabsorbent binder polymer composition of claim 14 wherein the chain transfer agent is at least one of alcohol, organic acid, inorganic acid, or organic amine.

21. The flexible superabsorbent binder polymer composition of claim 14 wherein the chain transfer agent is hypophosphorous acid.

22. The flexible superabsorbent binder polymer composition of claim 14 wherein said plasticizer is polyethylene glycol; said neutralizing agent is sodium hydroxide; and said acrylate or methacrylate ester that contains an alkoxysilane functionality is 3-(trimethoxysilyl)propyl methacrylate.

23. The flexible superabsorbent binder polymer composition of claim 14 having a solids content of at least 24%.

24. The flexible superabsorbent binder polymer composition of claim 14 wherein the initiator system comprises an initiator selected from sodium persulfate (NAPS); or 2,2'-azobis-2-amidinopropanedihydrchloride (ABAH).

25. The flexible superabsorbent binder polymer composition of claim 14 wherein the superabsorbent polymer has a weight average molecular weight of from about 100,000 to about 300,000 g/mole.

26. The flexible superabsorbent binder polymer composition of claim 14 wherein the transition metal salt is iron sulfate.

27. The flexible superabsorbent binder polymer composition of claim 8 further comprising a silanol functional crossliniking agent.

28. The flexible superabsorbent binder polymer composition of claim 14 further comprising a silanol functional crossliniking agent.

* * * * *

UNITED STATES PATENT AND TRADEMARK OFFICE
CERTIFICATE OF CORRECTION

PATENT NO. : 7,312,286 B2
APPLICATION NO. : 11/293043
DATED : December 25, 2007
INVENTOR(S) : Angela Jones Lang et al.

It is certified that error appears in the above-identified patent and that said Letters Patent is hereby corrected as shown below:

Column 2,
Line 19, "a gelling." should be replaced by -- as gelling. --.

Line 22, "then" should be replaced by -- than --.

Column 3,
Line 55, "a aqueous" should be replaced by -- an aqueous --.

Column 4,
Line 3, "a average" should be replaced by -- an average --.

Column 7,
Line 53, "order provide" should be replaced by -- order to provide --.

Column 8,
Line 48, "wherein said the" should be replaced by -- wherein the said --.

Column 9,
Line 38, "amidinopropanedihydrchloride" should be replaced by
-- amidinopropanedihydrochloride --.

Line 44, "amidinopropanedihydrchloride" should be replaced by
-- amidinopropanedihydrochloride --.

Line 65, "drchloride diperoxyketals;" should be replaced by -- drochloride, diperoxyketals; --.

Column 10,
Line 33, "1000,000" should be replaced by -- 100,000 --.

Column 11,
Line 34, "attapolgite: and" should be replaced by -- attapolgite, and --.

Column 12,
Line 38, "a aqueous" should be replaced by -- an aqueous --.

Line 48, "comprising ; monoethylenically" should be replaced by -- comprising monoethylenically --.

Column 13,
Line 36, "a average" should be replaced by -- an average --.

UNITED STATES PATENT AND TRADEMARK OFFICE
CERTIFICATE OF CORRECTION

PATENT NO. : 7,312,286 B2
APPLICATION NO. : 11/293043
DATED : December 25, 2007
INVENTOR(S) : Angela Jones Lang et al.

It is certified that error appears in the above-identified patent and that said Letters Patent is hereby corrected as shown below:

Column 14,
Line 42, "Brinkman Titoprocessor" should be replaced by -- Brinkmann Titoprocessor --.

Line 45, "a assumed" should be replaced by -- an assumed --.

Column 18,
Line 5, "drchloride(ABAH)" should be replaced by -- drochloride(ABAH) --.

Column 21,
Line 21, "stirred to" should be replaced by -- stirred for --.

Column 23,
Line 11, "amidinopropanedihydrchloride (ABAH)" should be replaced by -- amidinopropanedihydrochloride (ABAH) --.

Column 24,
Line 29, "amidinopropanedihydrchloride (ABAH)" should be replaced by -- amidinopropanedihydrochloride (ABAH) --.

Line 39, "crossliniking" should be replaced by -- crosslinking --.

Line 42, "crossliniking" should be replaced by -- crosslinking --.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,312,286 B2
APPLICATION NO. : 11/293043
DATED : December 25, 2007
INVENTOR(S) : Angela Jones Lang et al.

It is certified that error appears in the above-identified patent and that said Letters Patent is hereby corrected as shown below:

Column 7

Line 4: "Dow Corning®" should read -- Dow Corning Corp. --.

Line 30: "functional" should read -- functionality --.

Column 15

Line 62: "(2.8 mL, $1.18 \times 10^{-2}$)" should read -- (2.8 mL, $1.18 \times 10^{-2}$ moles) --.

Column 16

Line 31: "6.59 sodium hydroxide" should read -- 6.59 g sodium hydroxide --.

Line 37: "51,143" should read -- 51,143 ppm --.

Column 17

Line 31: "(1.4 mL, $0.59 \times 10^{-2}$)" should read -- (1.4 mL, $0.59 \times 10^{-2}$ moles) --.

Line 48: "6.59 sodium hydroxide" should read -- 6.59 g sodium hydroxide --.

Signed and Sealed this

Seventh Day of December, 2010

David J. Kappos
*Director of the United States Patent and Trademark Office*